(12) United States Patent
Philbert

(10) Patent No.: US 7,830,270 B1
(45) Date of Patent: Nov. 9, 2010

(54) VEHICLE SECURITY ALARM SYSTEM AND ASSOCIATED METHOD

(76) Inventor: Medaline Philbert, 173 Webster Ave., Yonkers, NY (US) 10701

( * ) Notice: Subject to any disclaimer, the term of this patent is extended or adjusted under 35 U.S.C. 154(b) by 297 days.

(21) Appl. No.: 12/284,699

(22) Filed: Sep. 24, 2008

Related U.S. Application Data

(60) Provisional application No. 60/994,947, filed on Sep. 24, 2007.

(51) Int. Cl.
G08B 21/00 (2006.01)
(52) U.S. Cl. .................. 340/667; 340/584; 340/539.15; 340/573.1
(58) Field of Classification Search .................. 340/584, 340/539.15, 573.1, 666, 667
See application file for complete search history.

(56) References Cited

U.S. PATENT DOCUMENTS

| | | | |
|---|---|---|---|
| 5,949,340 A | 9/1999 | Rossi | |
| 6,393,348 B1 * | 5/2002 | Ziegler et al. | 340/438 |
| 6,696,943 B1 * | 2/2004 | Elrod et al. | 340/539.1 |
| 6,922,147 B1 | 7/2005 | Viksnins | |
| 6,924,742 B2 * | 8/2005 | Mesina | 340/573.1 |
| 7,009,522 B2 * | 3/2006 | Flanagan et al. | 340/666 |
| 7,079,016 B2 | 7/2006 | Ho | |
| 7,081,811 B2 * | 7/2006 | Johnston et al. | 340/449 |
| 7,218,218 B1 * | 5/2007 | Rogers | 340/522 |
| 7,230,530 B1 * | 6/2007 | Almquist | 340/539.15 |
| 7,348,880 B2 * | 3/2008 | Hules et al. | 340/522 |
| 7,701,358 B1 * | 4/2010 | White et al. | 340/667 |
| 2003/0038722 A1 * | 2/2003 | Khairallah et al. | 340/584 |
| 2004/0095252 A1 * | 5/2004 | Kraljic et al. | 340/687 |
| 2005/0024188 A1 * | 2/2005 | Sider | 340/425.5 |

* cited by examiner

Primary Examiner—Eric M Blount

(57) ABSTRACT

A vehicle alarm system for notifying a caregiver when a child is seated inside an existing vehicle may include a portable controller carried by the caregiver and a stationary controlled situated within the vehicle. The stationary controller may include a fluctuating threshold operating parameter updating mechanism as well as an emergency signal emitting mechanism. The updating mechanism compares the occupant's body temperature with the maximum and minimum temperature thresholds. Such threshold depends on the air temperature inside the vehicle. If the body temperature is above or below such save limits, the updating mechanism notifies the emergency signal emitting mechanism which relays the information to the portable controller. The emergency signal emitting mechanism also includes sensors that activate the system when the vehicle ignition is turned off. Further, emergency signal emitting mechanism produces an alert signal if the seatbelts remain locked, signifying a remaining occupant in a parked vehicle.

15 Claims, 3 Drawing Sheets

VEHICLE SECURITY ALARM SYSTEM AND ASSOCIATED METHOD

CROSS REFERENCE TO RELATED APPLICATIONS

This application claims the benefit of U.S. Provisional Application No. 60/994,947, filed Sep. 24, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to security alarms and, more particularly, to a vehicle alarm system for notifying a caregiver when a child is seated inside the existing vehicle during unsafe conditions.

2. Prior Art

Bringing home a new baby is usually a joyful occasion. The addition of new family member, however, can be stressful on a family as the presence of a new family member changes family dynamics. Also, with a new baby in the home, parents or caretakers are often sleep deprived due to an infant's irregular feeding and sleeping schedules. A long period of sleep deprivation can have a significant effect on a person's memory. Tragically, every year infants die or are seriously injured due to a driver inadvertently forgetting that an infant is in the back seat of a car, and leaving the vehicle for long periods of time, such as while they are working or shopping. If the weather is either very hot or very cold, the infant can perish prior to anyone becoming aware of the dangerous situation. According to one report, more than 120 children died from heat stroke in a vehicle between 1996 and 2000 from being left in a parked vehicle between 1996 and 2000 in the United States.

U.S. Pat. No. 6,922,147 to Viksnins discloses a warning system for detecting a child left in a child car seat in a vehicle. The system comprises a child car seat, a child occupant sensor, a temperature sensor, and an alarm. The child occupant sensor includes an input to detect a child in the child car seat, and an output providing a signal representative of whether a child is present in the child car seat. The temperature sensor includes an input to detect an ambient vehicle temperature, and an output to provide a signal responsive to the ambient vehicle temperature. The alarm is coupled to the child occupant sensor output and the temperature sensor output. The alarm is configured to provide a warning using information about whether the child is present in the child car seat and the ambient vehicle temperature is outside an acceptable range. Unfortunately, this prior art reference does not monitor a child's body temperature to determine whether the child is at risk.

U.S. Pat. No. 7,079,016 to Ho discloses an apparatus for providing an indication to a person external to a vehicle, of an occupant inside the vehicle. The method comprises determining whether a first object in the vehicle is an occupant, based, in part, on a weight of the first object; sensing whether an ignition of the vehicle is in an off position; detecting whether a first door coupled to the vehicle has been opened and closed, if the vehicle ignition is in an off position; if the first door has been opened and closed and an occupant is in the vehicle, measuring a first time (T1) from an instant the first door is closed to an instant after the first door is closed; and activating the alert, if T1 is greater than a predetermined threshold time. Unfortunately, this prior art reference does not include a remote controller to alert the caretaker when an occupant is still seated in the parked vehicle. The caretaker may not notice an alert emanating from the vehicle if the caretaker hurriedly walks away after exiting. U.S. Pat. No. 5,949,340 to Rossi discloses an apparatus for warning when a child has been left in an infant seat and a vehicle as been turned to an off position. The apparatus includes an occupant detection mechanism for detecting the presence of an occupant within an infant seat located within a vehicle; an ignition detection mechanism for detecting the state of the vehicle's ignition system; a control unit for generating an alarm signal when the occupant detection mechanism detects the presence of an occupant within the infant seat and the ignition detection mechanism detects that the vehicle's ignition system has been turned from an "on" state to an "off" state; and an alarm unit for generating an alarm in response to the alarm signal. The components of the apparatus can be located within the infant seat, within the vehicle or combined within the infant seat and the vehicle. Unfortunately, this prior art reference does not include a means of determining and relating the body temperature of an occupant, left inside the parked vehicle, to a hand held remote controller carried by the user.

Accordingly, a need remains for a vehicle alarm system in order to overcome the above-noted shortcomings. The present invention satisfies such a need by providing a system that is convenient and easy to use, is durable yet lightweight in design, is versatile in its applications, and provides a means of notifying a caregiver when a child is seated inside the existing vehicle during unsafe conditions.

BRIEF SUMMARY OF THE INVENTION

In view of the foregoing background, it is therefore an object of the present invention to provide a system and associated method for providing a means of notifying a caregiver when a child is seated inside the existing vehicle during unsafe conditions. These and other objects, features, and advantages of the invention are provided by a vehicle alarm system.

The present invention meets the above-mentioned needs by providing a system, method, and computer program product for providing a vehicle alarm system for notifying a caregiver when a child is seated inside the existing vehicle during unsafe conditions and includes a graphical user interface. The system also includes software code logic for accessing, in response to receiving a request from the user via the graphical user interface, and software code logic for processing accessed information.

A vehicle alarm system for notifying a caregiver when a child is seated inside the existing vehicle during unsafe conditions may include a portable controller adapted to be carried by the caregiver and a stationary controller adapted to be situated within the existing vehicle. Such a stationary controller may be electrically coupled to a power source of the existing vehicle. Also, the stationary controller may include a mechanism for continuously updating a fluctuating threshold operating parameter to a desired level based upon a detected real-time air temperature inside the existing vehicle. This may operate such that the fluctuating threshold operating parameter may be continuously modified in direct proportion to a change in the detected real-time air temperature inside the existing vehicle.

The stationary controller may further include a mechanism for emitting an emergency signal when at least one detected real-time operating parameter exceeds the fluctuating threshold operating parameter after an ignition of the existing vehicle is toggled to an off mode. In operation, the stationary controller may be housed within the vehicle's dashboard panel such that the user may easily operate the controller and view its functions from the driver seat of the vehicle.

The fluctuating threshold operating parameter and the detected real-time operating parameter may be continuously and simultaneously displayed on the portable controller so that the caregiver may be able to remotely monitor a real-time safety level of the child seated inside the existing vehicle. In this manner, if the user steps out of the car for a moment, either at the car wash or while filling their gas tank, they may continue to monitor their child and the temperature level inside the vehicle.

Additionally, at least one of the detected real-time operating parameters may detect the real-time body temperature of the child seated inside the existing vehicle. Further, the fluctuating threshold operating parameter updating mechanism and the emergency signal emitting mechanism are preferably independently operable such that the fluctuating threshold operating parameter may be continuously adjusted while the emergency signal emitting signal is off.

The fluctuating threshold operating parameter updating mechanism additionally may include a first plurality of sensors adapted to be communicatively coupled to an existing seatbelt of the existing vehicle. Each of such first plurality of sensors may periodically generate and transmit a respective first signal that identifies the detected real-time child body temperature. As the child's body temperature rises or falls, the parent may be able to pay close attention to ensure dangerous temperature levels are not reached.

In addition, a second plurality of sensors may be adapted to be disposed within the existing vehicle. Each of such second plurality of sensors may periodically generate and transmit a respective second signal that identifies the detected real-time air temperature inside the existing vehicle. As heat levels inside of a vehicle may rise rapidly on during different seasons, this feature is extremely important for safety reasons. Further, a processor may be included and electrically coupled directly to the second sensors for receiving the second signals.

The fluctuating threshold operating parameter updating mechanism may also include a memory electrically coupled to the processor. Such a memory preferably includes programmable software instructions that cause the vehicle alarm system to continuously increase and decrease the fluctuating threshold operating parameter as the detected real-time air temperature inside the existing vehicle rises and falls respectively. Thus, as the detected real-time air temperature in the vehicles rises, the alarm system increases the fluctuating threshold operating parameter. In this manner, the user is alerted when significant temperature changes occur.

In addition, the fluctuating threshold operating parameter updating mechanism may include a database containing a list of unique tolerance range coefficients for each of the unique fluctuating threshold operating parameters. The list of unique tolerance range coefficients may be defined by a maximum coefficient value and a minimum coefficient value respectively. Furthermore, an unsafe real-time air temperature may have a narrower tolerance range than a safe detected real-time air temperature. Also, the unsafe real-time air temperature may be defined above 80 degrees Fahrenheit and below 60 degrees Fahrenheit respectively. This allows for the activation of the alarm whenever air temperatures reach above or below levels that may begin to affect the child, therefore allowing the parent to prevent harm well before it begins to occur.

The system may further include the programmable software instructions including and executing a control logic algorithm. Such an algorithm may include the first step of learning the detected real-time air temperature inside the existing vehicle by requesting receipt of the second signals. A second step of the algorithm may include querying the database and locating a pair of the tolerance range coefficients associated with the detected real-time air temperature.

Finally, the algorithm may determine the fluctuating threshold operating parameter by making two calculations. The first of these calculations may include multiplying the maximum coefficient value with the learned detected real-time air temperature value for determining a maximum limit of the fluctuating threshold operating parameter. The second calculation may include multiplying the minimum coefficient value with the learned detected real-time air temperature value for determining a minimum limit of the fluctuating threshold operating parameter. In this fashion, the algorithm determines the maximum and minimum acceptable child body temperatures before detecting the real-time child body temperature.

The control logic algorithm further may include the steps of first learning the detected real-time child body temperature by requesting receipt of the first signal. Second, the algorithm may compare the learned detected real-time child body temperature to the maximum and minimum fluctuating threshold operating parameter limits respectively. Additionally, the algorithm may include a third step of determining if the real-time child body temperature value is greater or less than the maximum and minimum air temperature value limits respectively and if so, then the algorithm may generate and transmit an instruction signal to the emergency signal emitting mechanism.

The system may additionally include the emergency signal emitting mechanism preferably having a first transceiver in wireless communication with the portable controller. Further, the emergency signal emitting mechanism may include a tuned frequency verification circuit communicatively coupled to the transceiver and the processor respectively. A transducer may also be included and communicatively coupled to the processor for receiving the instruction signals and thereafter generating and emitting the emergency signal. In addition, a third plurality of sensors may be adapted to be electrically coupled to seatbelts of the existing vehicle. Such a third plurality of sensors may send true and false third signals when the vehicle seatbelts are toggled between closed and open positions respectively. This notifies the user that one or more seatbelts are still in use, a reminder that the child is still in the vehicle.

Further, the emergency signal emitting mechanism may include a vehicle ignition sensor adapted to be electrically coupled to an ignition of the existing vehicle. The vehicle ignition sensor may generate and transmit true and false fourth signals when the vehicle ignition is toggled between off and on modes respectively. In this manner, when the user turns the vehicle ignition off, the signal may serve to activate the alarm to remind the user an occupant is still in the vehicle, thereby preventing the user from accidentally forgetting the occupant.

Additionally, a logic gate may be included and electrically coupled directly to the vehicle ignition sensor and the third plurality of sensors respectively. The logic gate may generate and transmit an output signal based upon receipt of the respective third and fourth signals respectively. Such an output signal preferably has a true value when both of the third and fourth signals have true values. Further, the output signal preferably has a false value when at least one of the third and fourth signals has a false value. Furthermore, the output signal may authorize the processor to initiate execution of the control logic algorithm and thereby adjust the fluctuating threshold operating parameter.

The vehicle alarm system may further include the portable controller with a user interface for generating an operating signal based upon receipt of a user input. The controller additionally may have a display screen electrically coupled to the user interface for displaying the fluctuating threshold operating parameter as well as the detected real-time child body temperature. This allows the user to instantly monitor, via the display screen, the status of the occupant seated within the vehicle. Also, the controller may include a tuned frequency generating circuit electrically coupled to the user interface for encoding the operating signal to a predetermined frequency.

In addition, a second transceiver may be included and electrically coupled directly to the tune frequency generating circuit for wirelessly transmitting the encoded operating signal to the stationary controller. The wireless communication between the controllers is important so that the user may continue to monitor temperature activity within the vehicle from a distance. Further, the tuned frequency verification circuit, seated in the stationary controller, may decode the encoded operating signal and determine whether the portable controller is authorized to receive and display an update of the fluctuating threshold operating parameter and the detected real-time child body temperature on the display screen respectively.

The sensors of the alarm system may be selected from a group of sensors that may include: a thermocouple, a thermistor, or any combination thereof for converting a temperature potential differential into a voltage potential differential and a resistance potential differential respectively. In addition, the voltage and resistance potential differentials may be embedded in the first signals respectively.

The present invention may further include a method for notifying a caregiver when a child is seated inside the existing vehicle during unsafe conditions. The method may include the first step of providing a portable controller adapted to be carried by the caregiver. The method may include the second step of providing a stationary controller adapted to be situated within the existing vehicle as well as electrically coupled to a power source of the existing vehicle respectively. A third step of the method may include the stationary controller continuously updating a fluctuating threshold operating parameter to a desired level based upon a detected real-time air temperature inside the existing vehicle such that the fluctuating threshold operating parameter is continuously modified in direct proportion to a change in the detected real-time air temperature inside the existing vehicle.

Fourth, the method may include the step of the stationary controller emitting an emergency signal when at least one detected real-time operating parameter exceeds the fluctuating threshold operating parameter after an ignition of the existing vehicle is toggled to an off mode. The third and fourth steps may be independently operable such that the fluctuating threshold operating parameter may be continuously adjusted while the emergency signal is off.

Finally, the fifth step of the method may include continuously and simultaneously displaying the fluctuating threshold operating parameter and at least one detected real-time operating parameter on the portable controller so that the caregiver is able to remotely monitor a real-time safety level of the child seated inside the existing vehicle. At least one of the detected real-time operating parameters preferably includes a detected real-time body temperature of the child seated inside the existing vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
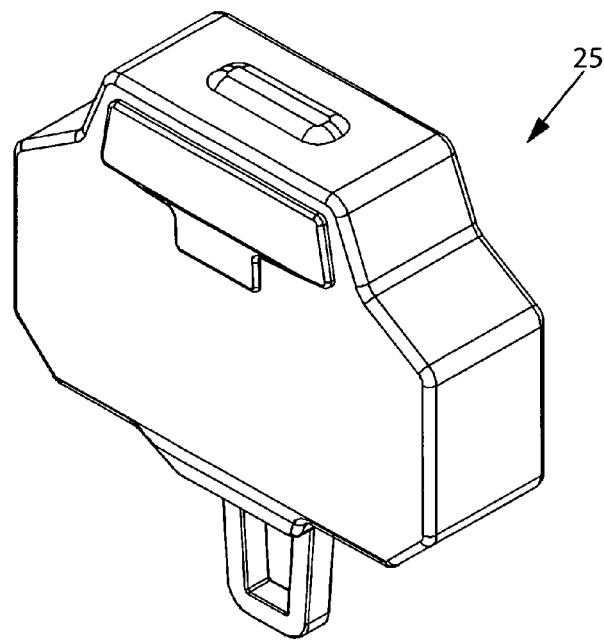
FIG. 1 is a perspective view showing one of the sensors that couples to an existing vehicle seatbelt, in accordance with the present invention'
Figures 2, 3:
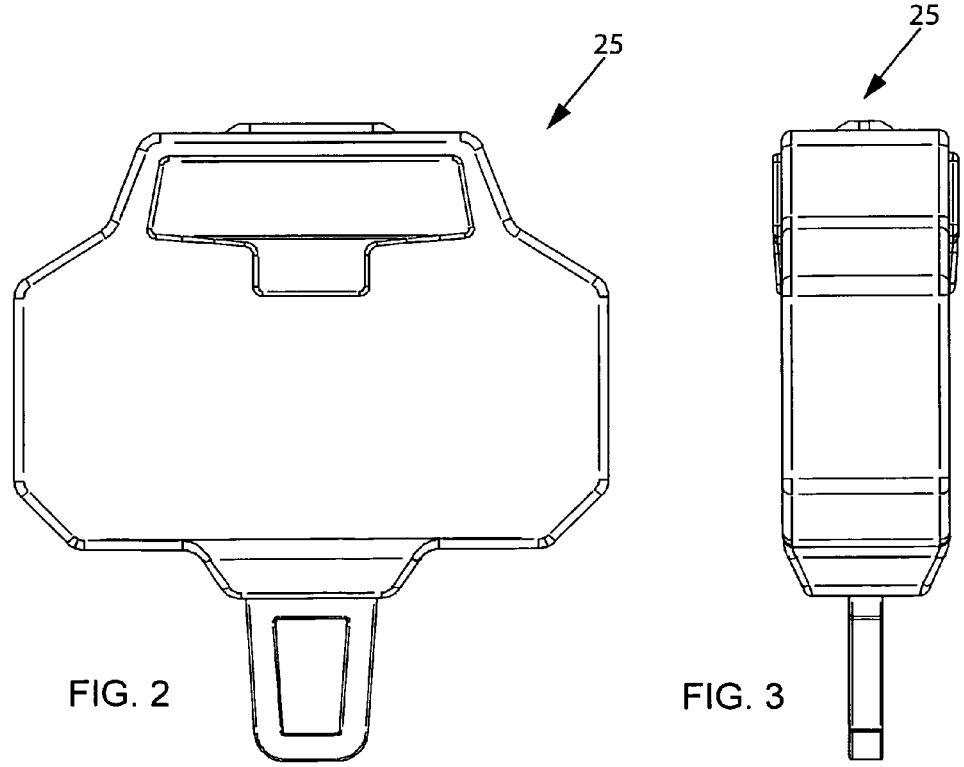
FIG. 2 is a front elevation view of the sensor in FIG. 1.
FIG. 3 is a side elevation view of the sensor in FIG. 1.
Figure 4:
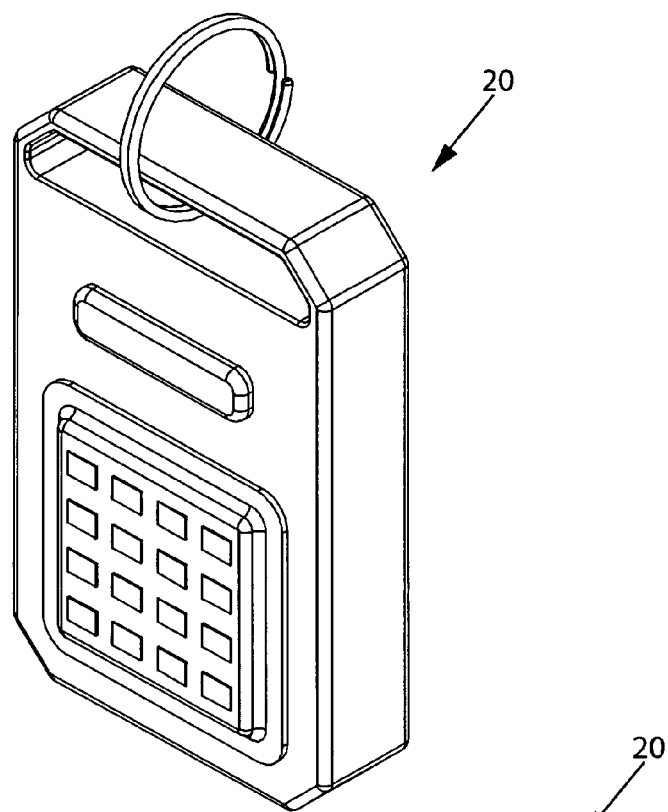
FIG. 4 is a perspective view of a portable controller communicatively coupled to the sensor shown in FIG. 1.
Figure 5:
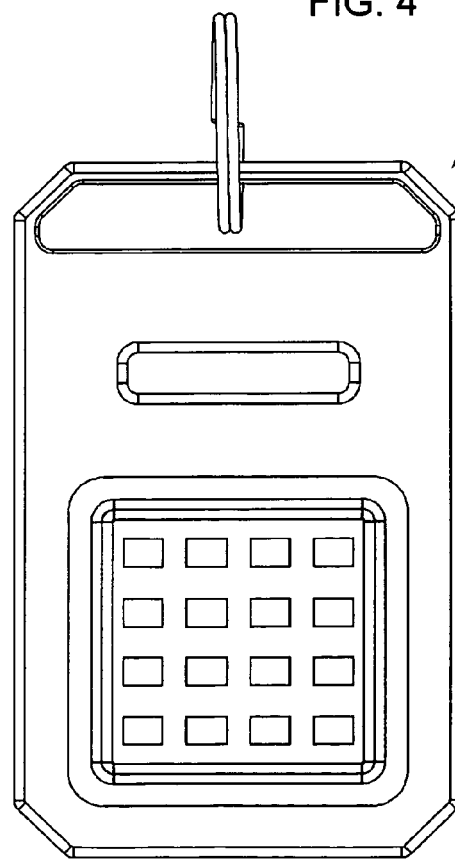
FIG. 5 is a front elevation view of the controller in FIG. 4.
Figure 6:
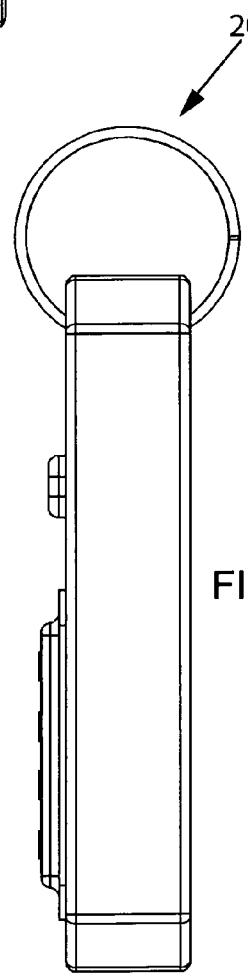
FIG. 6 is a side elevation view of the controller in FIG. 4.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-7 by the reference numeral 10 and is intended to protect a child seated inside the existing vehicle during unsafe conditions. It should be understood that the system 10 may be used to protect many different types of vehicle occupants during unsafe conditions and should not be limited in use to the applications mentioned herein. For example, the present invention may be employed to protect elderly or disabled individuals seated inside an existing vehicle during unsafe condition. Unsafe conditions may include those where the occupant's body temperature rises above a safe maximum temperature or falls below a safe minimum temperature.

Referring to FIGS. 4, 5, 6, and 7, a vehicle alarm system 10 for notifying a caregiver when a child is seated inside the existing vehicle during unsafe conditions may include a portable controller 20 adapted to be carried by the caregiver and a stationary controller 21 adapted to be situated within the existing vehicle. Such a stationary controller 21 may be electrically coupled to a power source of the existing vehicle and may also include a mechanism 22 for continuously updating a fluctuating threshold operating parameter to a desired level based upon a detected real-time air temperature inside the existing vehicle. Such a fluctuating threshold operating parameter is preferably a maximum and minimum acceptable body temperature for an occupant left in side the vehicle, as explained in detail below. The fluctuating threshold operating parameter may be continuously modified in direct proportion to a change in the detected real-time air temperature inside the existing vehicle.

The stationary controller 21 may further include a mechanism 23 for emitting an emergency signal when at least one detected real-time operating parameter exceeds the fluctuating threshold operating parameter after an ignition 24 of the existing vehicle is toggled to an off mode. In operation, the stationary controller 21 may be housed within the vehicle's dashboard panel such that the user may easily operate the stationary controller 21 and view its functions from the driver seat of the vehicle.

Referring again to FIGS. 4, 5, 6, and 7, the fluctuating threshold operating parameter and the detected real-time operating parameter may be continuously and simultaneously displayed on the portable controller 20 so that the caregiver may be able to remotely monitor a real-time safety level of the child seated inside the existing vehicle. In this manner, if the user steps out of the vehicle for a moment, either at a car wash or a service station, for example, they may continue to monitor their child and the temperature level inside the vehicle. This valuable feature overcomes problems with the prior art by granting the user some flexibility. Other inventions emit an alert signal as soon as the user exits an occupied vehicle. The present invention, on the other hand, allows the user to briefly exit and return to an occupied vehicle to complete minor tasks without having to undesirably remove the child occupant, thus saving the user time.

Additionally, at least one of the detected real-time operating parameters may be the detected real-time body temperature of the child seated inside the existing vehicle. Further, the fluctuating threshold operating parameter updating mechanism 22 and the emergency signal emitting mechanism 23 are preferably independently operable such that the fluctuating threshold operating parameter may be continuously adjusted while the emergency signal emitting mechanism 23 is off.

Referring to FIGS. 1, 2, 3, and 7, the fluctuating threshold operating parameter updating mechanism 22 additionally may include a first plurality of sensors 25 adapted to be communicatively coupled to an existing seatbelt 26 of the existing vehicle. Each of such first plurality of sensors 25 periodically may generate and transmit a respective first signal 27 that identifies the detected real-time child body temperature. As the child's body temperature rises or falls, the parent may be able to pay close attention to ensure dangerous temperature levels are not reached.

Figure 7:
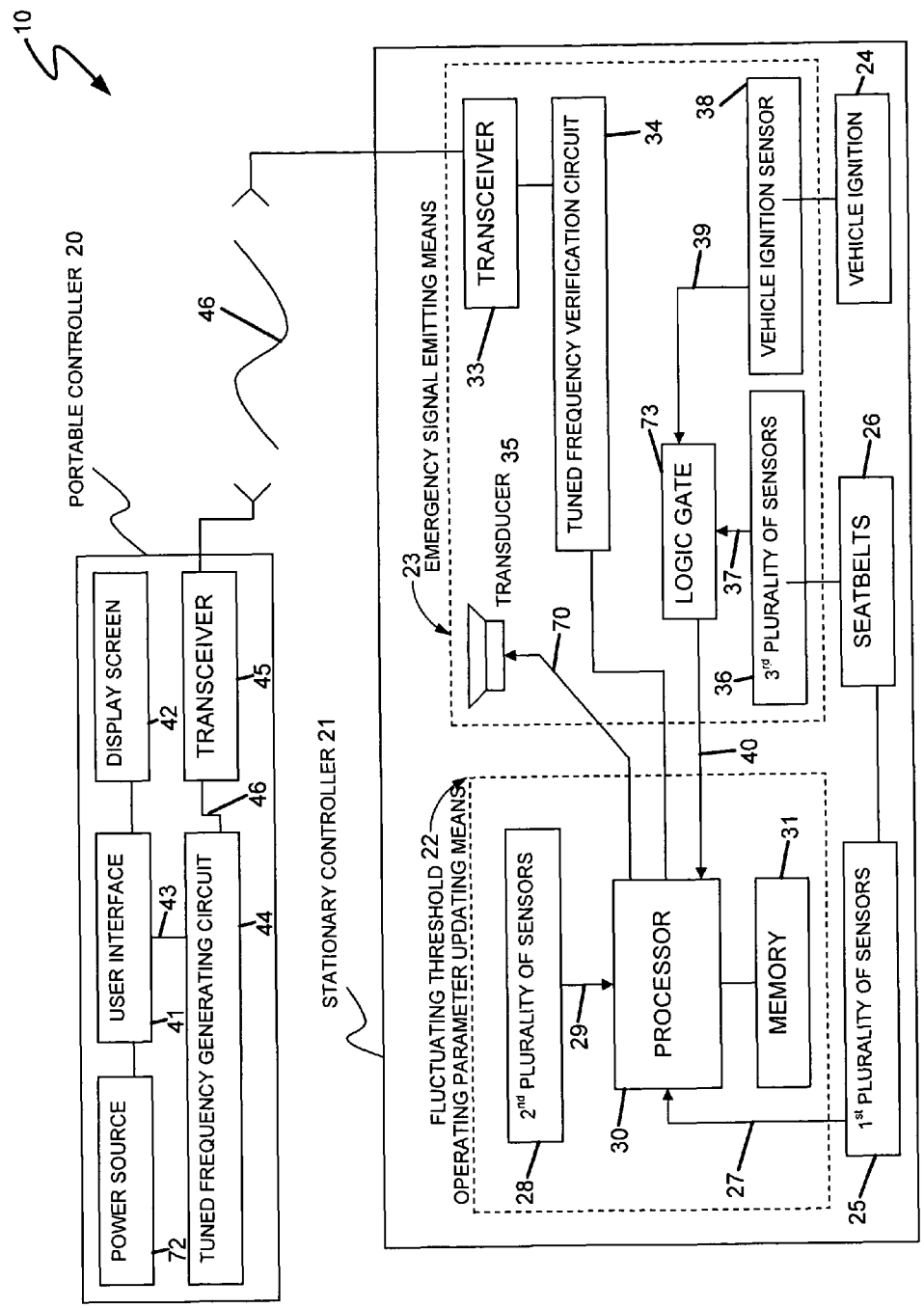
FIG. 7 is a schematic block diagram of the vehicle alarm system showing the stationary controller and the portable remote controller in wireless communication with each other, in accordance with the intended function of the present invention.

Referring now to FIG. 7, a second plurality of sensors 28 may be adapted to be disposed within the existing vehicle. Each of such second plurality of sensors 28 may periodically generate and transmit a respective second signal 29 that identifies the detected real-time air temperature inside the existing vehicle.

As heat levels inside of a vehicle may rise rapidly during different seasons, this feature is extremely important for safety reasons. Further, a processor 30 may be included and electrically coupled directly to the second sensors 28 for receiving the second signals 29.

The fluctuating threshold operating parameter updating mechanism 22 may also include a memory 31 electrically coupled to the processor 30. Such a memory 31 preferably includes programmable software instructions that continuously increase and decrease the fluctuating threshold operating parameter as the detected real-time air temperature inside the existing vehicle rises and falls respectively. Thus, the system 10 may be adapted to use in different temperature conditions.

Referring now to FIG. 7, the fluctuating threshold operating parameter updating mechanism 22 may include a database containing a list of unique tolerance range coefficients for each unique one of the fluctuating threshold operating parameter. The list of unique tolerance range coefficients may be defined by a maximum coefficient value and a minimum coefficient value respectively. Furthermore, an unsafe real-time air temperature may have a narrower tolerance range than a safe detected real-time air temperature. Also, the unsafe real-time air temperature may be defined above 80 degrees Fahrenheit and below 60 degrees Fahrenheit respectively. In this manner, the vehicle alarm system 10 is more likely to emit an alert signal as the real-time air temperature rises above 80 degrees Fahrenheit or falls below 60 degrees Fahrenheit.

The programmable software instructions, included in the memory 31, may include and execute a control logic algorithm. Such an algorithm may include the first step of learning the detected real-time air temperature inside the existing vehicle by requesting receipt of the second signals 29. A second step of the algorithm may include querying the database and locating a pair of the tolerance range coefficients associated with the detected real-time air temperature. Finally, the algorithm may determine the fluctuating threshold operating parameter by making two calculations. The first of these calculations may include multiplying the maximum coefficient value with the learned detected real-time air temperature value for determining a maximum limit of the fluctuating threshold operating parameter. The second calculation may include multiplying the minimum coefficient value with the learned detected real-time air temperature value for determining a minimum limit of the fluctuating threshold operating parameter. This procedure establishes the maximum and minimum allowable body temperatures for the child or vehicle occupant.

The control logic algorithm further may include the steps of first learning the detected real-time child body temperature by requesting receipt of the first signal 27. Second, the algorithm may compare the learned detected real-time child body temperature to the maximum and minimum fluctuating threshold operating parameter limits respectively. Additionally, the algorithm may include a third step of determining if the real-time child body temperature value is greater or less than the maximum and minimum air temperature value limits respectively, and if so, then the algorithm may generate and transmit an instruction signal 70 to the emergency signal emitting mechanism 23.

If the child's real-time body temperature is greater then the maximum air temperature value limit, the emergency signal emitting mechanism 23 will emit an emergency signal. Conversely, the emergency signal emitting mechanism 23 will also emit an emergency signal if the child's real-time body temperature is less than the minimum air temperature value limit. Thus, the vehicle alarm system 10 notifies the user when an occupant becomes dangerously hot or dangerously cold.

Referring to FIGS. 4, 5, 6, and 7, the emergency signal emitting mechanism 23 preferably includes a first transceiver 33 in wireless communication with the portable controller 20. Further, the emergency signal emitting mechanism 23 may include a tuned frequency verification circuit 34 communicatively coupled to the transceiver 33 and the processor 30 respectively. A transducer 35 may also be included and communicatively coupled to the processor 30 for receiving the instruction signals 70 and thereafter generating and emitting the emergency signal. Of course, as one skilled in the art may recognize, a transducer 35 may refer to a broad range of electronic or electro-mechanical devices that convert one type of energy to another. Such devices may be an audio loudspeaker, a piezoelectric crystal, or a photodiode, which converts the electric instruction signals 70 into observable emergency signals.

Referring again to FIG. 7, a third plurality of sensors 36 may be adapted to be electrically coupled to seatbelts 26 of the existing vehicle. Such a third plurality 36 of sensors may send true and false third signals 37 when the vehicle seatbelts are toggled between closed and open positions respectively. This notifies the user that one or more seatbelts 26 are in use, a reminder that the child is still in the vehicle.

Further, the emergency signal emitting mechanism 23 may include a vehicle ignition sensor 38 adapted to be electrically coupled to an ignition 24 of the existing vehicle. The vehicle ignition sensor 38 may generate and transmit true and false fourth signals 39 when the vehicle ignition is toggled between off and on modes respectively. Therefore, when the user turns the vehicle ignition 24 off, the third 37 and fourth 39 signals may activate the system 10 to remind the user that a child is still in the vehicle, thereby preventing the user from accidentally forgetting the child. This feature also provides that the system 10 will not undesirably emit an alert signal when the vehicle ignition 24 is turned on during normal operation of the vehicle, for example.

Additionally, a logic gate 73 may be included and electrically coupled directly to the vehicle ignition sensor 38 and the third plurality of sensors 36 respectively. The logic gate 73 may generate and transmit an output signal 40 based upon receipt of the respective third 37 and fourth 39 signals respectively. Such an output signal 40 preferably has a true value when both of the third 37 and fourth 39 signals have true values. Further, the output signal may have a false value when at least one of the third 37 and fourth 39 signals has a false value. The output signal 40 activates the system 10 by authorizing the processor 30 to initiate execution of the control logic algorithm and thereby adjust the fluctuating threshold operating parameter.

In this manner, the logic gate 73 only authorizes the processor 30 to initiate the control logic algorithm by sending a true output signal 40. The logic gate 73 sends a true output signal 40 only upon receipt of true third 37 and fourth 39 signals from the third plurality of sensors 36 and the vehicle ignition sensor 38 respectively. Thus, in order for the processor 30 to initiate the control logic algorithm, the seatbelts 26 must be in a closed position and the vehicle ignition 24 must be in an off mode. These combined elements provide a valuable benefit wherein the system 10 automatically activates when the user shuts off the vehicle ignition 24. Thus, a parent who may forget to remove their child from a parked vehicle is not burdened by having to remember to activate the vehicle alarm system 10.

Referring to FIGS. 4, 5, 6, and 7, the portable controller 20 may include power source 72 electronically coupled to a user interface 41. Such a user interface 41 may generate an operating signal 43 based upon receipt of a user input. The controller 20 may additionally have a display screen 42 electrically coupled to the user interface 41 for displaying the fluctuating threshold operating parameter as well as the detected real-time child body temperature. This feature is important in that it enables the user to exit a parked vehicle briefly while safely leaving the child occupant behind. In this manner, the user may conveniently and remotely monitor the status of a child within the vehicle via the hand held controller 20. Also, the controller 20 may include a tuned frequency generating circuit 44 electrically coupled to the user interface 41 for encoding the operating signal 43 to a predetermined frequency. This feature allows multiple systems 10 and controllers 20 to operate in given vicinity without creating interference.

In addition, a second transceiver 45 may be included and electrically coupled directly to the tune frequency generating circuit 44 for wirelessly transmitting the encoded operating signal 46 to the stationary controller 21. The wireless communication between the controllers 20, 21 is important so that the user at great distances from the vehicle may continue to monitor the body temperature and therefore the safety of an occupant seated therein. Further, the tuned frequency verification circuit 34, seated in the stationary controller 21, may decode the encoded operating signal 46 and determine whether the portable controller 20 is authorized to receive and display an update of the fluctuating threshold operating parameter and the detected real-time child body temperature on the display screen respectively.

Again, the unique communication between the tuned frequency verification circuit 34 and the tuned frequency generating circuit 44 is crucial for protecting the user's privacy. In this fashion, one user employing a first handheld controller 20 may not intercept the fluctuating threshold operating parameter and the detected real-time child body temperature from another user's stationary controller 21. This feature not only protects the users' privacy, but further ensures that the stationary controller 21 alerts the proper handheld controller 20 if unsafe conditions occur.

The sensors of the vehicle alarm system 10, particularly the first 25 and second 28 plurality of sensors, which measure changes in temperature, may be selected from a group of sensors that may include: a thermocouple, a thermistor, and any combination thereof for converting a temperature potential differential into a voltage potential differential and a resistance potential differential respectively. In addition, the voltage and resistance potential differentials may be embedded in the first signals 27 respectively.

In use, the present invention may provide a method for notifying a caregiver when a child is seated inside the existing vehicle during unsafe conditions. The method may include the first step of providing a portable controller 20 adapted to be carried by the caregiver. The method may include the second step of providing a stationary controller 21 adapted to be situated within the existing vehicle as well as electrically coupled to a power source of the existing vehicle respectively. A third step of the method may include the stationary controller 21 continuously updating a fluctuating threshold operating parameter to a desired level based upon a detected real-time air temperature inside the existing vehicle such that the fluctuating threshold operating parameter is continuously modified in direct proportion to a change in the detected real-time air temperature inside the existing vehicle.

The method may include the fourth step of the stationary controller 21 emitting an emergency signal when at least one detected real-time operating parameter exceeds the fluctuating threshold operating parameter after an ignition 24 of the existing vehicle is toggled to an off mode. The third and fourth steps may be independently operable such that the fluctuating threshold operating parameter may be continuously adjusted while the emergency signal is off.

Finally, the method may include the fifth step of continuously and simultaneously displaying the fluctuating threshold operating parameter and the at least one detected real-time operating parameter on the portable controller 20 so that the caregiver is able to remotely monitor a real-time safety level of the child seated inside the existing vehicle. At least one of the detected real-time operating parameters preferably includes a detected real-time body temperature of the child seated inside the existing vehicle.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vehicle alarm system for notifying a caregiver when a child is seated inside the existing vehicle during unsafe conditions, said vehicle alarm system comprising:

a portable controller adapted to be carried by the caregiver; and a stationary controller adapted to be situated within the existing vehicle as well as electrically coupled to a power source of the existing vehicle respectively, said stationary controller comprising means for continuously updating a fluctuating threshold operating parameter to a desired level based upon a detected real-time air temperature inside the existing vehicle such that said fluctuating threshold operating parameter is continuously modified in direct proportion to a change in the detected real-time air temperature inside the existing vehicle, and means for emitting an emergency signal when at least one detected real-time operating parameter exceeds said fluctuating threshold operating parameter after an ignition of the existing vehicle is toggled to an off mode;

wherein said fluctuating threshold operating parameter and said at least one detected real-time operating parameter are continuously and simultaneously displayed on said portable controller so that the caregiver is able to remotely monitor a real-time safety level of the child seated inside the existing vehicle;

wherein said at least one detected real-time operating parameter comprises a detected real-time body temperature of the child seated inside the existing vehicle.

2. The vehicle alarm system of claim 1, wherein said fluctuating threshold operating parameter updating means comprises:

a first plurality of sensors adapted to be communicatively coupled to an existing seatbelt of the existing vehicle, each of said first plurality of sensors periodically generating and transmitting a respective first signal that identifies said detected real-time child body temperature;

a second plurality of sensors adapted to be disposed within the existing vehicle, each of said second plurality of sensors periodically generating and transmitting a respective second signal that identifies the detected real-time air temperature inside the existing vehicle;

a processor electrically coupled directly to said second sensors for receiving said second signals;

a memory electrically coupled to said processor, said memory including programmable software instructions that cause said vehicle alarm system to continuously increase and decrease said fluctuating threshold operating parameter as the detected real-time air temperature inside the existing vehicle rises and falls respectively; and a database including a list of unique tolerance range coefficients for each unique one of said fluctuating threshold operating parameter, said list of unique tolerance range coefficients being defined by a maximum coefficient value and a minimum coefficient value respectively.

wherein an unsafe real-time air temperature has a narrower tolerance range than a safe detected real-time air temperature;

wherein said unsafe real-time air temperature is defined above 80 degrees Fahrenheit and below 60 degrees Fahrenheit respectively.

3. The vehicle alarm system of claim 2, wherein said programmable software instructions comprises and executes a control logic algorithm including the steps of:

a. learning said detected real-time air temperature inside the existing vehicle by requesting receipt of said second signals;

b. querying said database and locating a pair of said tolerance range coefficients associated with said detected real-time air temperature; and c. determining said fluctuating threshold operating parameter by performing the following steps multiplying said maximum coefficient value with said learned detected real-time air temperature value for determining a maximum limit of said fluctuating threshold operating parameter, and multiplying said minimum coefficient value with said learned detected real-time air temperature value for determining a minimum limit of said fluctuating threshold operating parameter.

4. The vehicle alarm system of claim 3, wherein said control logic algorithm further includes the steps of:

d. learning said detected real-time child body temperature by requesting receipt of said first signal;

e. comparing said learned detected real-time child body temperature to said maximum and minimum fluctuating threshold operating parameter limits respectively; and f. if said real-time child body temperature value is greater or less than said maximum and minimum air temperature value limits respectively, then generating and transmitting an instruction signal to said emergency signal emitting means.

5. The vehicle alarm system of claim 4, wherein said emergency signal emitting means comprises:

a first transceiver in wireless communication with said portable controller;

a tuned frequency verification circuit communicatively coupled to said transceiver and said processor respectively;

a transducer communicatively coupled to said processor for receiving said instructions signals and thereafter generating and emitting said emergency signal;

a third plurality of sensors adapted to be electrically coupled to seatbelts of the existing vehicle, said third plurality of sensors sending true and false third signals when the vehicle seatbelts are toggled between closed and open positions respectively;

a vehicle ignition sensor adapted to be electrically coupled to an ignition of the existing vehicle, said vehicle ignition sensor generating and transmitting true and false fourth signals when the vehicle ignition is toggled between off and on modes respectively;

a logic gate electrically coupled directly to said vehicle ignition sensor and said third plurality of sensors respectively, said generating and transmitting an output signal based upon receipt of said respective third and fourth signals respectively, said output signal having a true value when both of said third and fourth signals have true values, said output signal having a false value when at least one of said third and fourth signals have a false value;

wherein said output signal authorizes said processor to initiate execution of said control logic algorithm and thereby adjust said fluctuating threshold operating parameter.

6. The vehicle alarm system of claim 5, wherein said portable controller comprises:

a user interface for generating an operating signal based upon receipt of a user input;

a display screen electrically coupled to said user interface for displaying said fluctuating threshold operating parameter as well as the detected real-time child body temperature;

a tuned frequency generating circuit electrically coupled to said user interface for encoding said operating signal to a predetermined frequency; and a second transceiver electrically coupled directly to said tune frequency generating circuit for wirelessly transmitting said encoded operating signal to said stationary controller;

wherein said tuned frequency verification circuit decodes said encoded operating signal and determines whether said portable controller is authorized to receive and display an update of said fluctuating threshold operating parameter and the detected real-time child body temperature on said display screen respectively.

7. The vehicle alarm system of claim 6, wherein said sensors are selected from a group of sensors comprising: a thermocouple, a thermistor and any combination thereof for converting a temperature potential differential into a voltage potential differential and a resistance potential differential respectively, said voltage and resistance potential differentials being embedded in said first signals respectively.

8. A vehicle alarm system for notifying a caregiver when a child is seated inside the existing vehicle during unsafe conditions, said vehicle alarm system comprising:

a portable controller adapted to be carried by the caregiver; and a stationary controller adapted to be situated within the existing vehicle as well as electrically coupled to a power source of the existing vehicle respectively, said stationary controller comprising means for continuously updating a fluctuating threshold operating parameter to a desired level based upon a detected real-time air temperature inside the existing vehicle such that said fluctuating threshold operating parameter is continuously modified in direct proportion to a change in the detected real-time air temperature inside the existing vehicle, and means for emitting an emergency signal when at least one detected real-time operating parameter exceeds said fluctuating threshold operating parameter after an ignition of the existing vehicle is toggled to an off mode;

wherein said fluctuating threshold operating parameter and said at least one detected real-time operating parameter are continuously and simultaneously displayed on said portable controller so that the caregiver is able to remotely monitor a real-time safety level of the child seated inside the existing vehicle;

wherein said at least one detected real-time operating parameter comprises a detected real-time body temperature of the child seated inside the existing vehicle;

wherein said fluctuating threshold operating parameter updating means and said emergency signal emitting means are independently operable such that said fluctuating threshold operating parameter is continuously adjusted while said emergency signal emitting signal is off.

9. The vehicle alarm system of claim 8, wherein said fluctuating threshold operating parameter updating means comprises:

a first plurality of sensors adapted to be communicatively coupled to an existing seatbelt of the existing vehicle, each of said first plurality of sensors periodically generating and transmitting a respective first signal that identifies said detected real-time child body temperature;

a second plurality of sensors adapted to be disposed within the existing vehicle, each of said second plurality of sensors periodically generating and transmitting a respective second signal that identifies the detected real-time air temperature inside the existing vehicle;

a processor electrically coupled directly to said second sensors for receiving said second signals;

a memory electrically coupled to said processor, said memory including programmable software instructions that cause said vehicle alarm system to continuously increase and decrease said fluctuating threshold operating parameter as the detected real-time air temperature inside the existing vehicle rises and falls respectively; and a database including a list of unique tolerance range coefficients for each unique one of said fluctuating threshold operating parameter, said list of unique tolerance range coefficients being defined by a maximum coefficient value and a minimum coefficient value respectively, wherein an unsafe real-time air temperature has a narrower tolerance range than a safe detected real-time air temperature;

wherein said unsafe real-time air temperature is defined above 80 degrees Fahrenheit and below 60 degrees Fahrenheit respectively.

10. The vehicle alarm system of claim 9, wherein said programmable software instructions comprises and executes a control logic algorithm including the steps of:

g. learning said detected real-time air temperature inside the existing vehicle by requesting receipt of said second signals;

h. querying said database and locating a pair of said tolerance range coefficients associated with said detected real-time air temperature; and i. determining said fluctuating threshold operating parameter by performing the following steps multiplying said maximum coefficient value with said learned detected real-time air temperature value for determining a maximum limit of said fluctuating threshold operating parameter, and multiplying said minimum coefficient value with said learned detected real-time air temperature value for determining a minimum limit of said fluctuating threshold operating parameter.

11. The vehicle alarm system of claim 10, wherein said control logic algorithm further includes the steps of:

j. learning said detected real-time child body temperature by requesting receipt of said first signal;

k. comparing said learned detected real-time child body temperature to said maximum and minimum fluctuating threshold operating parameter limits respectively; and l. if said real-time child body temperature value is greater or less than said maximum and minimum air temperature value limits respectively, then generating and transmitting an instruction signal to said emergency signal emitting means.

12. The vehicle alarm system of claim 11, wherein said emergency signal emitting means comprises:

a first transceiver in wireless communication with said portable controller;

a tuned frequency verification circuit communicatively coupled to said transceiver and said processor respectively;

a transducer communicatively coupled to said processor for receiving said instructions signals and thereafter generating and emitting said emergency signal;

a third plurality of sensors adapted to be electrically coupled to seatbelts of the existing vehicle, said third plurality of sensors sending true and false third signals when the vehicle seatbelts are toggled between closed and open positions respectively;

a vehicle ignition sensor adapted to be electrically coupled to an ignition of the existing vehicle, said vehicle ignition sensor generating and transmitting true and false fourth signals when the vehicle ignition is toggled between off and on modes respectively;

a logic gate electrically coupled directly to said vehicle ignition sensor and said third plurality of sensors respectively, said logic gate generating and transmitting an output signal based upon receipt of said respective third and fourth signals respectively, said output signal having a true value when both of said third and fourth signals have true values, said output signal having a false value when at least one of said third and fourth signals have a false value;

wherein said output signal authorizes said processor to initiate execution of said control logic algorithm and thereby adjust said fluctuating threshold operating parameter.

13. The vehicle alarm system of claim 12, wherein said portable controller comprises:

a user interface for generating an operating signal based upon receipt of a user input;

a display screen electrically coupled to said user interface for displaying said fluctuating threshold operating parameter as well as the detected real-time child body temperature;

a tuned frequency generating circuit electrically coupled to said user interface for encoding said operating signal to a predetermined frequency; and a second transceiver electrically coupled directly to said tune frequency generating circuit for wirelessly transmitting said encoded operating signal to said stationary controller;

wherein said tuned frequency verification circuit decodes said encoded operating signal and determines whether said portable controller is authorized to receive and display an update of said fluctuating threshold operating parameter and the detected real-time child body temperature on said display screen respectively.

14. The vehicle alarm system of claim 13, wherein said sensors are selected from a group of sensors comprising: a thermocouple, a thermistor and any combination thereof for converting a temperature potential differential into a voltage potential differential and a resistance potential differential respectively, said voltage and resistance potential differentials being embedded in said first signals respectively.

15. A method for notifying a caregiver when a child is seated inside the existing vehicle during unsafe conditions, said method comprising the chronological steps of:

a. providing a portable controller adapted to be carried by the caregiver; and b. providing a stationary controller adapted to be situated within the existing vehicle as well as electrically coupled to a power source of the existing vehicle respectively;

c. said stationary controller continuously updating a fluctuating threshold operating parameter to a desired level based upon a detected real-time air temperature inside the existing vehicle such that said fluctuating threshold operating parameter is continuously modified in direct proportion to a change in the detected real-time air temperature inside the existing vehicle, and d. said stationary controller emitting an emergency signal when at least one detected real-time operating parameter exceeds said fluctuating threshold operating parameter after an ignition of the existing vehicle is toggled to an off mode;

e. continuously and simultaneously displaying said fluctuating threshold operating parameter and said at least one detected real-time operating parameter on said portable controller so that the caregiver is able to remotely monitor a real-time safety level of the child seated inside the existing vehicle;

wherein said at least one detected real-time operating parameter comprises a detected real-time body temperature of the child seated inside the existing vehicle;

wherein steps c. and d. are independently operable such that said fluctuating threshold operating parameter is continuously adjusted while said emergency signal is off.

* * * * *